(12) United States Patent
Altman

(10) Patent No.: US 10,063,080 B2
(45) Date of Patent: Aug. 28, 2018

(54) ELECTRONIC DEVICE INCLUDING BATTERY AND METHOD OF CONTROLLING SAME FOR CHARGING THE BATTERY

(71) Applicant: BlackBerry Limited, Waterloo (CA)

(72) Inventor: Benjamin Altman, Mississauga (CA)

(73) Assignee: BlackBerry Limited, Waterloo (CA)

( * ) Notice: Subject to any disclaimer, the term of this patent is extended or adjusted under 35 U.S.C. 154(b) by 274 days.

(21) Appl. No.: 14/963,125

(22) Filed: Dec. 8, 2015

(65) Prior Publication Data

US 2017/0163067 A1   Jun. 8, 2017

(51) Int. Cl.
  *H02J 7/00*   (2006.01)
  *H04M 1/00*   (2006.01)
  *H02J 1/00*   (2006.01)

(52) U.S. Cl.
  CPC ............. *H02J 7/0057* (2013.01); *H02J 1/00* (2013.01); *H02J 7/00* (2013.01); *H02J 7/0036* (2013.01); *H02J 2007/0067* (2013.01)

(58) Field of Classification Search
  CPC .... H02J 7/0057; H02J 1/00; H02J 7/00; H02J 7/0036; H02J 2007/0067; H02J 7/0068; H02J 7/022; H02J 7/0073; Y02E 60/12; H01M 10/44; H04W 52/02; H04W 52/0229; H04W 52/0225; H04W 52/028; H04B 1/1615
  USPC .......................................... 320/137; 455/574
  See application file for complete search history.

(56) References Cited

U.S. PATENT DOCUMENTS

| 5,291,118 | A | * | 3/1994 | Kojima | G01R 31/3624 |
| | | | | | 320/150 |
| 6,418,535 | B1 | * | 7/2002 | Kulakowski | G06F 1/263 |
| | | | | | 713/320 |
| 6,445,936 | B1 | | 9/2002 | Cannon et al. | |
| 7,058,484 | B1 | | 6/2006 | Potega | |

(Continued)

FOREIGN PATENT DOCUMENTS

| EP | 2113983 A1 | 11/2009 |
| WO | 9407293 A1 | 3/1994 |
| WO | 2004075371 A1 | 9/2004 |

OTHER PUBLICATIONS

Print out of "5 Tips for Charging Your iPhone Faster" retrieved on Nov. 26, 2015 from http://www.scrubly.com/blog/how-to-iphone/5-tips-for-charging-your-iphone-faster/.

(Continued)

*Primary Examiner* — Yalkew Fantu
*Assistant Examiner* — Mohammed J Sharief
(74) *Attorney, Agent, or Firm* — Borden Ladner Gervais LLP; Geoffrey deKleine

(57) ABSTRACT

A method of controlling a portable electronic device that has a battery. The method includes, in response to detecting coupling of the portable electronic device to a charger for charging the battery of the portable electronic device, determining if a condition is met to enter a reduced battery use state, and in response to determining that the condition to enter the reduced battery use state is met, identifying a configuration setting of the portable electronic device in the reduced battery use state, and entering the reduced battery use state by applying the configuration setting to adjust a configuration of the portable electronic device.

18 Claims, 8 Drawing Sheets

(56) References Cited

U.S. PATENT DOCUMENTS

| | | | |
|---|---|---|---|
| 2009/0119527 A1* | 5/2009 | Kim | G06F 1/30 |
| | | | 713/323 |
| 2011/0012561 A1* | 1/2011 | Whiting | H01M 10/44 |
| | | | 320/149 |
| 2012/0315960 A1* | 12/2012 | Kim | H04W 52/0254 |
| | | | 455/574 |
| 2014/0134990 A1* | 5/2014 | Chou | H04W 52/0235 |
| | | | 455/418 |
| 2015/0123597 A1* | 5/2015 | Son | H02J 7/007 |
| | | | 320/107 |
| 2015/0263550 A1* | 9/2015 | Han | H02J 7/0042 |
| | | | 320/108 |

OTHER PUBLICATIONS

European Patent Application No. 16196825.0, Extended European Search Report dated May 29, 2017.

* cited by examiner

ELECTRONIC DEVICE INCLUDING BATTERY AND METHOD OF CONTROLLING SAME FOR CHARGING THE BATTERY

FIELD OF TECHNOLOGY

The present disclosure relates to the control of portable electronic devices for charging a battery of the portable electronic device.

BACKGROUND

Portable electronic devices have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth® capabilities.

Portable electronic devices such as PDAs or smart telephones are generally intended for handheld use and ease of portability. Such portable electronic devices include a rechargeable battery for providing power and portability. The time required to charge the battery is dependent on a number of factors, including, for example, initial charge state, charging current, and other factors.

Improvements in battery charging in such portable electronic devices are desirable.

BRIEF DESCRIPTION OF THE DRAWINGS

Embodiments of the present disclosure will now be described, by way of example only, with reference to the attached figures, in which.

DETAILED DESCRIPTION

Figure 1:
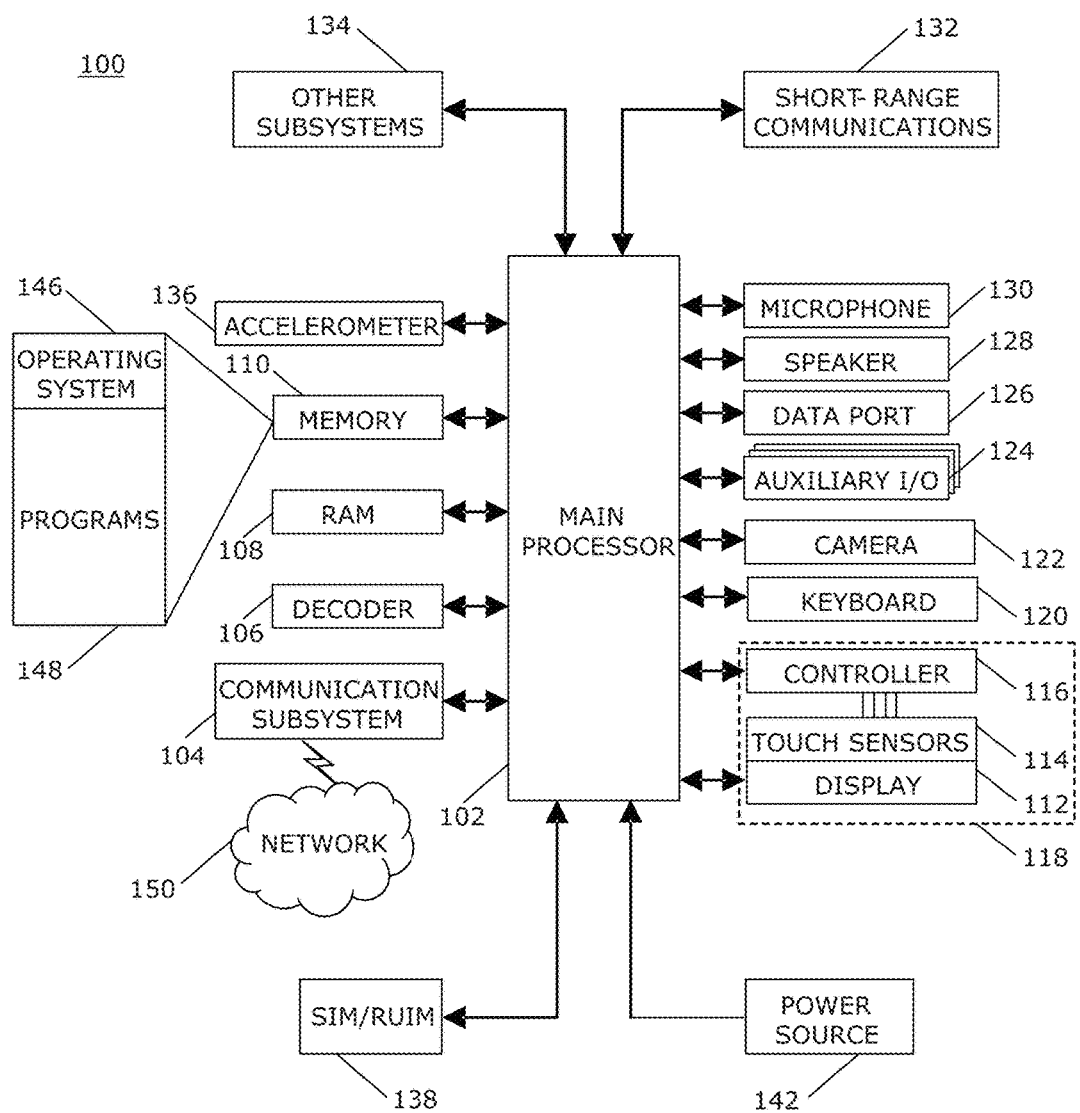
FIG. 1 is a block diagram of a portable electronic device in accordance with the present disclosure.

The following generally describes a portable electronic device including a battery and a method of controlling the portable electronic device. The method includes, in response to detecting coupling of the portable electronic device to a charger for charging the battery of the portable electronic device, determining if a condition is met to enter a reduced battery use state, and in response to determining that the condition to enter the reduced battery use state is met, identifying a configuration setting of the portable electronic device in the reduced battery use state, and entering the reduced battery use state by applying the configuration setting to adjust a configuration of the portable electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device such as a portable electronic device. Examples of portable electronic devices include mobile, or handheld, wireless communication devices such as cellular phones, cellular smart-phones, wireless organizers, personal digital assistants, wirelessly enabled notebook computers, tablet computers, cameras, mobile internet devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A battery 142, which includes one or more rechargeable batteries, powers the electronic device 100.

The processor 102 interacts with other components, such as a Random Access Memory (RAM) 108, memory 110, a touch-sensitive display 118, a keyboard 120, a camera 122, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 may be utilized for entry of characters such as alphabetical characters, numeric characters, punctuation, or symbols.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
FIG. 2 is a front view of an example of a portable electronic device in accordance with the disclosure.

An example of a portable electronic device 100 is shown in FIG. 2. In the example of FIG. 2, the portable electronic device 100 includes a housing 202 in which the touch-sensitive display 118 is disposed. The housing 202 is utilized to enclose components such as the components shown in FIG. 1. The touch-sensitive display 118 is utilized to display information including options that are selectable utilizing the touch-sensors of the touch-sensitive display 118. The keyboard of the portable electronic device 100 may be disposed behind the touch-sensitive display 118 and a touch-sensitive display portion of the housing 202 in the view of FIG. 2. The keyboard may be exposed by sliding the keyboard portion of the housing 202 relative to the touch-sensitive display portion of the housing 202.

For the purpose of the example of FIG. 2, information is displayed on the touch-sensitive display 118. The information displayed in this example is information on a home screen of the portable electronic device 100, and includes a time 204, a date 206, status indicators 208, showing wireless network connections, and a battery charge state, a selectable telephone option 210, to utilize a cellular telephone application on the portable electronic device 100, a selectable camera option 212 to utilize a camera application on the portable electronic device 100, and a lock indicator 214, indicating that the portable electronic device 100 is in a locked state in which device use is restricted.

Figure 3:
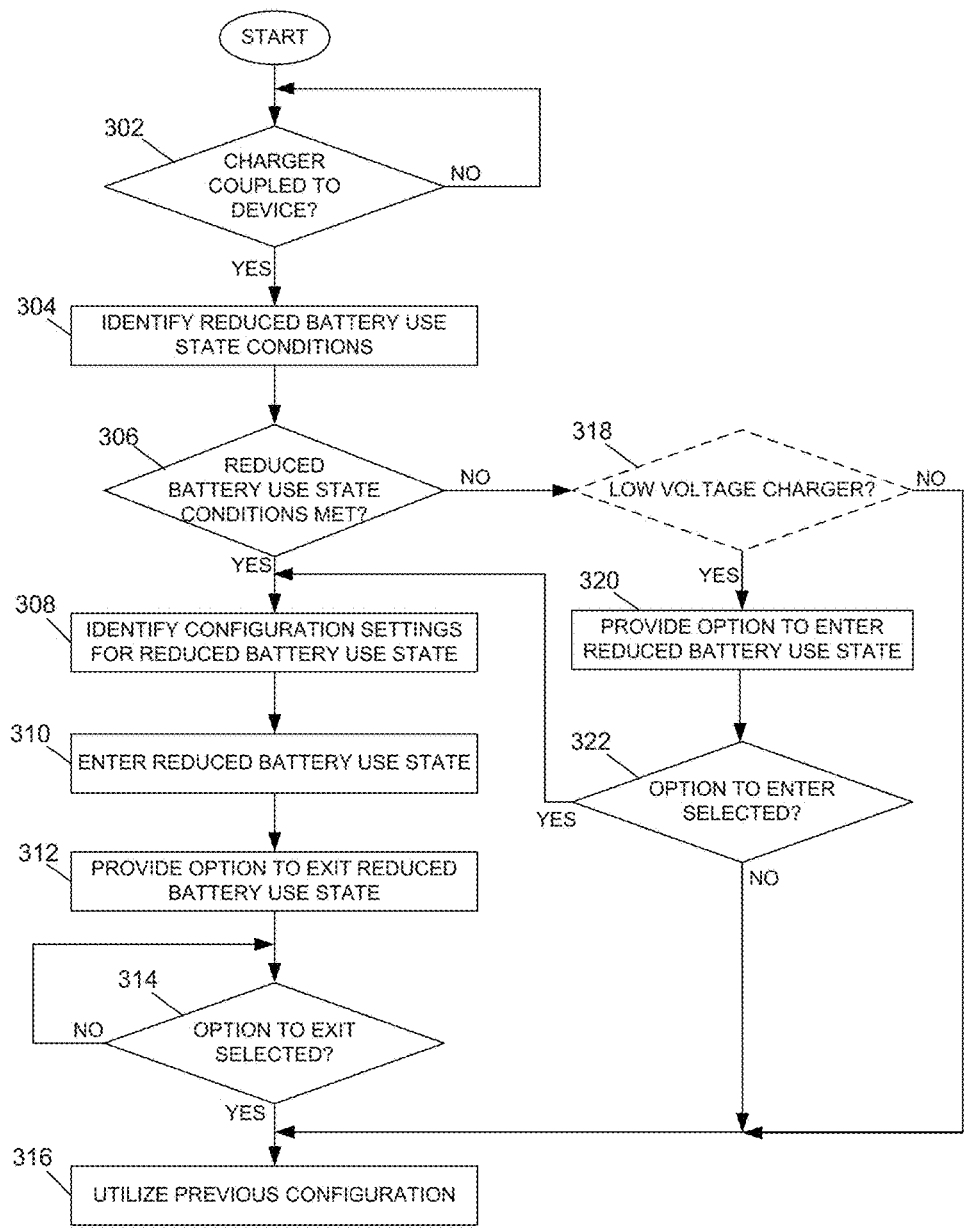
FIG. 3 is a flow chart illustrating a method of controlling a portable electronic device in accordance with the disclosure.

A flowchart illustrating a method of controlling a portable electronic device for charging a battery is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the portable electronic device 100 to perform the method may be stored in a computer-readable storage medium, such as a non-transitory computer-readable medium.

As indicated above, the battery 142, which includes one or more rechargeable batteries, powers the portable electronic device 100. The battery 142 is recharged by coupling the portable electronic device 100 to a charger. The charger includes or is coupled to a power source such as, for example, another battery, a wall socket, a USB port on a computer or in a vehicle, such as a car, or any other suitable power source during charging.

The processor 102 is operable to detect that the charger, which is coupled to or includes a power source, is coupled to the portable electronic device 100 and the battery is charging. In response to detecting that the portable electronic device is coupled to a charger for charging the battery at 302, the process continues at 304.

One or more conditions for entering a reduced battery use state during charging are identified at 304. The condition or conditions may include any suitable conditions and may include predefined settings or may include receipt of selection of an option to enter a reduced battery use state. The predefined settings may include user-defined conditions, factory set conditions, or a combination of user-defined and factory set conditions. The conditions are stored in memory, such as the memory 110 of the portable electronic device 100. Such conditions for entering the reduced battery use state may include, for example, one or more of a current time of day falling within a predetermined time period, a current date being a predetermined day of the week of date, a charge level of the battery falling to or below a threshold level, a location identified, for example, utilizing GPS functionality or network connection, a current WiFi connection being a predetermined WiFi connection, wireless connection or lack of a wireless connection to a second electronic device, connection or lack of connection to a cellular network, use of a relatively low current charger, such as a coupling to a USB port of a computer, or any other suitable condition.

Conditions may optionally be grouped as rules such that a rule, which may include a single condition or may include a set of conditions, is met by meeting all conditions that comprise that rule. A plurality of rules may be stored in memory such that if any one rule is met, by meeting all conditions that comprise that rule, the portable electronic device enters the reduced battery use state.

In response to determining that the condition or conditions are met to enter the reduced battery use state at 306, the process continues at 308. The conditions are met, for example, by receipt of selection of an option to enter the reduced battery use state or by determining that conditions of at least one rule are met. Thus, the device state is compared to predetermined conditions at 306 to determine whether the predetermined conditions are met. For example, a current time may be compared to a predetermined time period, a current date may be compared to a predetermined day of the week of date, a charge level of the battery may be compared to a predetermined level, a location may be compared to a predetermined location or area, a current WiFi connection may be compared to a predetermined WiFi connection, a wireless connection to a second device may be identified and compared to a predetermined wireless connection or lack of a wireless connection may be identified, a current supplied by a charger may be identified and compared to a predetermined current or threshold current to determine if the current is below the predetermined current and is therefore a low current charger, or any other suitable comparison.

Configuration settings for the reduced battery use state are determined at 308. The configuration settings may include a touch-sensitive display 118 backlight setting, a cellular network connectivity setting, Wi-Fi connectivity, Bluetooth® connectivity, notifications settings, location services settings, electronic mail retrieval settings, touch detection settings, or any other suitable settings. The configuration settings are settings utilized to reduce the use of power by the portable electronic device 100 to facilitate faster charging of the battery 142.

The portable electronic device 100 enters the reduced battery use state at 310 by applying the configuration settings identified at 308 to adjust the configuration of the portable electronic device 100. Thus, the configuration of the portable electronic device 100 is adjusted by applying the settings to reduce the use of power by the portable electronic device. For example, the amount of light provided by the backlight may be reduced by applying a backlight setting, cellular network connectivity, Wi-Fi connectivity, and Bluetooth connectivity may be disabled, notifications may be turned off, location services may be disabled, retrieval of electronic mail may be disabled, touch detection may be disabled on part of the touch-sensitive display 118, touch detection accuracy may be reduced by adjusting scan rate or time between scans, or any other suitable configuration setting or any suitable combination of such configuration settings may be applied. The portable electronic device 100 may enter the reduced battery use state at 310 by entering an airplane mode in which all network connectivity is disabled, including cellular network connectivity, Wi-Fi connectivity, and Bluetooth® connectivity.

An option to exit the reduced battery use state is provided at 312. For example, an option to exit the reduced battery use state may be provided by displaying a selectable option to exit after entry into the reduced battery use state. The selectable option to exit may be selected, for example, upon detection of a touch on the touch-sensitive display, at an area associated with the selectable option. Alternatively, the option to exit the reduced battery use state may be selected by depression of a mechanical button such as a power button.

In response to detecting selection of the option to exit at 314, the process continues at 316 and the portable electronic device 100 exits the reduced battery use state by reverting to the configuration settings utilized immediately prior to detecting coupling of the portable electronic device 100 to the charger. Thus, the previously utilized configuration is restored.

In response to determining that the condition or conditions to enter the reduced battery use state are not met at 306, the process continues at 318. The conditions to enter the reduced battery use state are not met, for example, when at least one condition of each rule is not met.

In response to determining that the portable electronic device 100 is coupled to a low current charger, the process continues at 320. Thus, the current of the charger may be identified and compared to a predetermined current or threshold current level. In response to determining that the current is below the predetermined current and, thus, the charger is a low current charger, the process continues at 320.

A selectable option to enter the reduced battery use state is provided at 320. The selectable option may be provided, for example, by displaying an option on the touch-sensitive display 118. The option is selected, for example, by a touch on the touch-sensitive display 118, at an area associated with the option. In response to receipt of selection of the option to enter the reduced battery use state at 322, the process continues at 308. Thus, the portable electronic device 100 may enter the reduced battery use state, during charging, in response to receipt of selection of an option to enter the reduced battery use state while the battery is charged with a low current charge. In response to receipt of a selection of an option to not enter the reduced battery use state, the process continues at 316. Alternatively, or in addition, in response to absence of receipt of selection of the option to enter the reduced battery use state, the process continues at 316.

Alternatively, the option to enter the reduced battery use state during charging may be provided regardless of whether a low current charger is utilized. For example, such an option may be provided in response to determining that the reduced battery use state conditions are not met at 306. Thus, an option to enter the reduced battery use state may be provided during charging in response to determining that the reduced battery use state conditions are not met and therefore the portable electronic device 100 does not automatically enter the reduced battery use state.

The portable electronic device 100 may exit the process illustrated in FIG. 3 and automatically exit the reduced battery use state in response to detecting uncoupling of the charger from the portable electronic device 100. Thus, the portable electronic device 100 reverts to the configuration settings utilized immediately prior to detecting coupling of the portable electronic device 100 to the charger and the previously utilized configuration is restored.

Figure 4:
FIG. 4 through FIG. 12 illustrate examples of control of the portable electronic device and information displayed on the portable electronic device in accordance with the disclosure.
Figure 5:
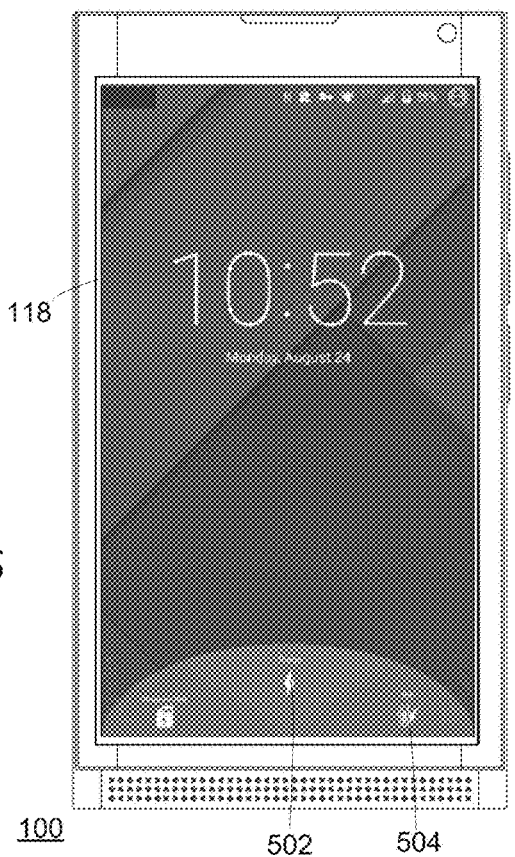
Figure 6:
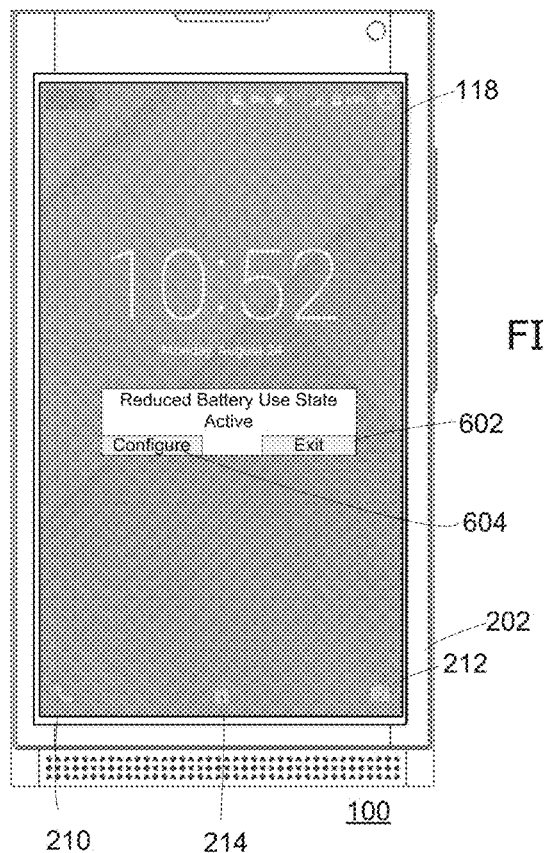

Reference is made to FIG. 4 through FIG. 6 with continued reference to FIG. 3 to describe examples of control of the portable electronic device and information displayed on the portable electronic device in the method of FIG. 3. As described above with reference to FIG. 2, a home screen is displayed on the touch-sensitive display 118 of the portable electronic device 100. A charger is coupled to the portable electronic device 100 and the portable electronic device 100 detects coupling to a charger for charging the battery at 302. Rules, including multiple conditions, for entry into the reduced battery use state are identified at 304. For the purpose of the present example, the rules, which include multiple conditions, for entering the reduced battery use state are not met at 306 and the process continues at 318. For the purpose of the present example, the charger is identified as a low current charger at 318 and the process continues at 320. An option to enter the reduced battery use state is provided at 320. A selectable option 402 to change a charge mode is illustrated in FIG. 4. In this example, the selectable option 402 is selected by a touch on the touch-sensitive display at an area associated with the selectable option 402.

Charge mode options 502, 504 are shown in FIG. 5 and are displayed in response to selection of the option 402 to change the charge mode. The charge mode options include a selectable option 502 to charge without changing configuration settings on the portable electronic device 100 and a selectable option 504 to charge in the reduced battery use state to reduce the time until the battery is fully charged or to increase the percentage charge in a set period of time.

For the purpose of the present example, the processor 102 of the portable electronic device 100 receives a selection of the selectable option 504 to charge in the reduced battery use state at 322 and the process continues at 308. The configuration settings for the reduced battery use state are determined at 308 and the portable electronic device 100 enters the reduced battery use state at 310 by applying the configuration settings identified at 308. In this example, a backlight setting is applied at 310 to reduce the light provided by the backlight of the touch-sensitive display 118. Other configuration settings may also be identified at 308 and applied at 310. As illustrated in FIG. 6, a selectable option 602 to exit the reduced battery use state is also displayed on the touch-sensitive display 118 at 312. In this example, a selectable option 604 to configure the reduced battery use state is also provided. In response to receipt of selection of the option 604 to configure the reduced battery use state, the portable electronic device 100 provides an interface for setting or changing the configuration settings for the reduced battery use state, such as the interface illustrated in the example of FIG. 7.

Figure 7:
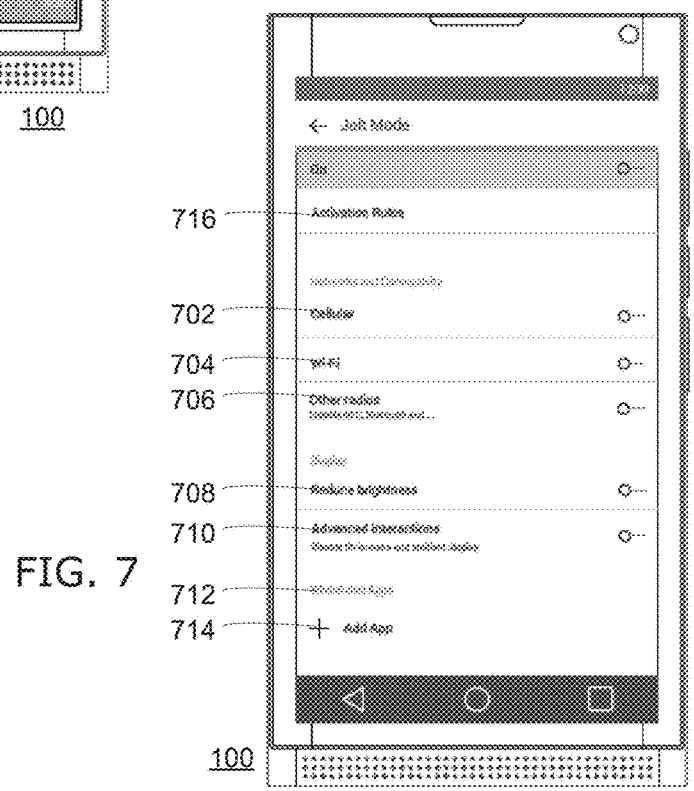

Reference is now made to FIG. 7 through FIG. 12 to describe further examples of control of the portable electronic device 100. Examples of user configurable rules and conditions for entering the reduced battery use state during charging are illustrated in FIG. 7 through FIG. 12. FIG. 7 illustrates one example of an interface utilized for setting rules and conditions for entry into the reduced battery use state and for setting or changing the configuration settings for the reduced battery use state. Default configuration settings for the reduced battery use state may be factory set or pre-set in the software. Such default configuration settings may be configurable or reset by a user as described with reference to FIG. 7.

In this example, the configuration settings for the reduced battery use state include network connectivity settings including a Cellular Network connectivity setting 702, a Wi-Fi connectivity setting 704, and Other radios connectivity setting 706. Such settings may be selected to disable or enable connectivity when in the reduced battery use state. Thus, cellular network connectivity, Wi-Fi connectivity, and other radios, including Bluetooth®, for example, may all be disabled or may be selectively enabled based on user defined configuration settings. In addition, display-related settings may be selected and adjusted, including a Reduce brightness setting 708 to adjust the brightness of the touch-sensitive display 118, and Advanced interactions setting 710, for example, to disable or enable display related interaction capabilities.

Optionally, applications may be included in a list 712 to maintain specific functionality or all functionality of the listed applications. Applications may be added by selection of an Add App option 714. Applications may also be subtracted from the list.

As indicated, the interface illustrated in FIG. 7 may also be utilized for setting rules and conditions for entry into the reduced battery use state, for example, by selection of the Activation Rules option 716. Default conditions for entry into the reduced battery use state may be factory set or pre-set in software. Such default conditions, however, may be configurable or reset by a user as described with reference to FIG. 7 through FIG. 12. For the purpose of the present example, rules, which each include one or more conditions, to enter the reduced battery use state are displayed in response selection of the Activation Rules option 716. Examples of the rules displayed in response to selection of the Activation Rules option 716 are illustrated in FIG. 8.

Figure 8:
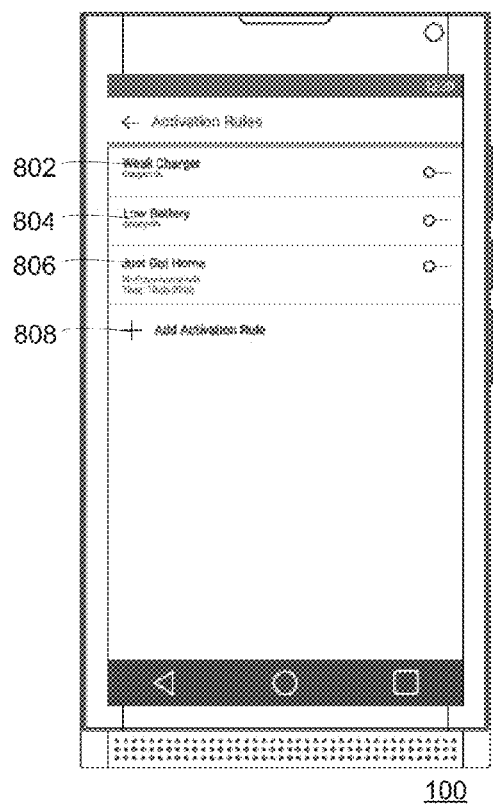

Three rules are illustrated in the example of FIG. 8, including rules named Weak Charger 802, Low Battery 804, and Just Got Home 806. The Weak Charger rule 802 includes a single condition based on current supplied by the charger. In response to determining that the current supplied by the charger is less than 1 Amp, the Weak Charger 802 rule is met. The Low Battery rule 804 also includes a single condition. In response to determining that the total battery charge is less than 5%, the Low Battery rule is met. The Just Got Home rule 806 includes two conditions. In response to determining that both the Wi-Fi is connected to my-home-Wifi and that the current time is from 18:00 to 20:00,the Just Got Home rule is met. Referring to the method of FIG. 3, the portable electronic device identifies the configuration settings at 308 and enters the reduced battery use state at 310 in response to determining that any one of the three rules is met.

The rules and conditions for entry into the reduced battery use state may be added for example, by selection of the Add Activation Rule option 808. For the purpose of the present example, a new rule interface is provided for creating a new rule in response to selection of the Add Activation Rule option 808. An example of the new rule interface is illustrated in FIG. 9.

Figure 9:
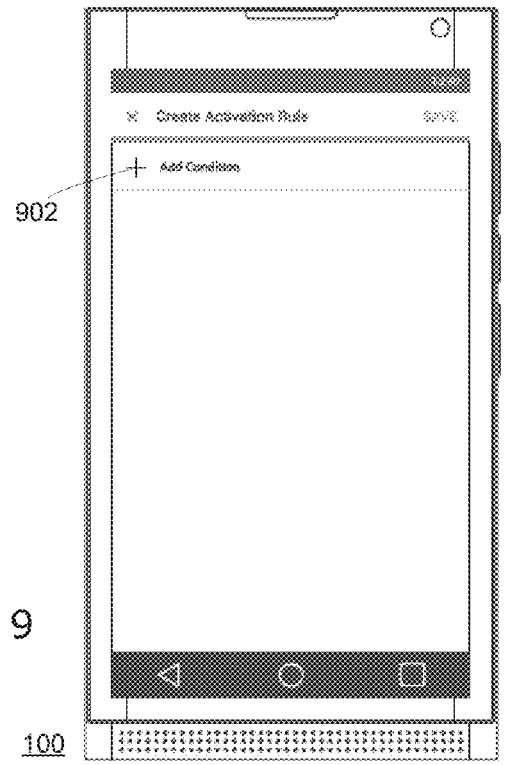

As shown in FIG. 9, a selectable Add Condition option 902 is provided for adding a condition to the new rule. In this example, the rule is new and no condition exists for the rule. In response to adding a condition, the condition may also be displayed in the interface of FIG. 9 in addition to the selectable Add Condition option 902.

Figure 10:
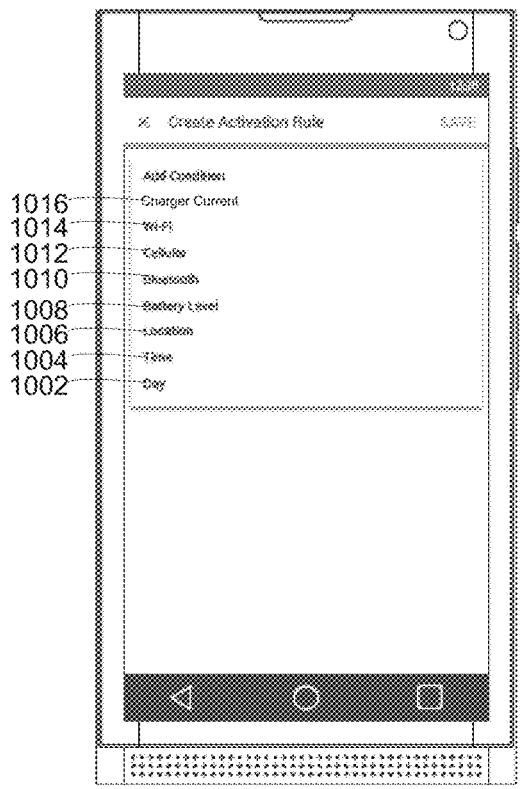

In response to receipt of selection of the Add Condition option 902, a list of selectable options related to conditions is provided, as illustrated in FIG. 10. In the example of FIG. 10, the list of selectable options related to conditions includes a selectable Day option 1002 for selecting a day or days of the week as a condition, a selectable Time option 1004 for selecting a time range as a condition, a selectable Battery Level option 1006 for selecting a threshold battery charge for a battery charge condition, a Location option 1008 for selecting an area, for example, utilizing a location services application, as a condition that is met when the portable electronic device 100 is within the area, a selectable Bluetooth® option 1010, for setting a Bluetooth® related condition that is met, for example, when a specified secondary device is in Bluetooth® communication with the portable electronic device 100, a selectable Cellular option 1012 for setting a cellular connection related condition that is met, for example, when the portable electronic device 100 is not connected to a cellular provider, a selectable Wi-Fi option 1014, for setting a Wi-Fi related condition that is met, for example, when the portable electronic device 100 is coupled to a specified Wi-Fi network, and a Charger Current option 1016 for setting a threshold current supplied by the charger as a condition that is met when the current does not meet the threshold level. Additional conditions may also be utilized.

Figure 11:
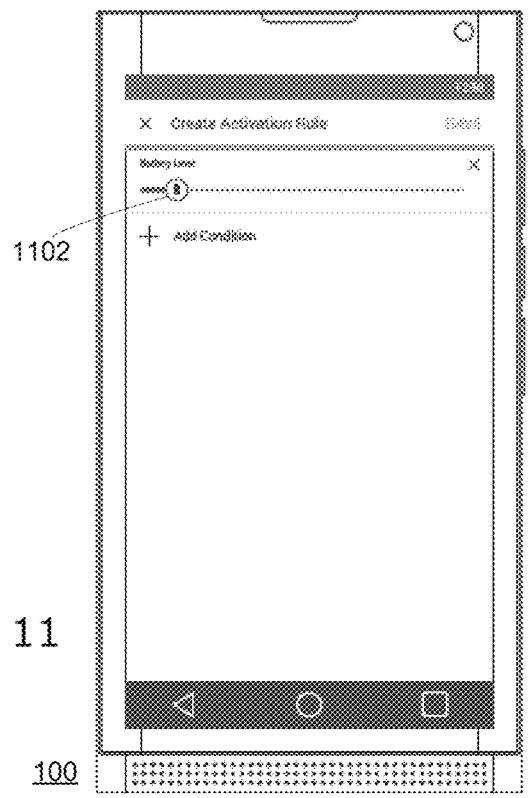
Figure 12:
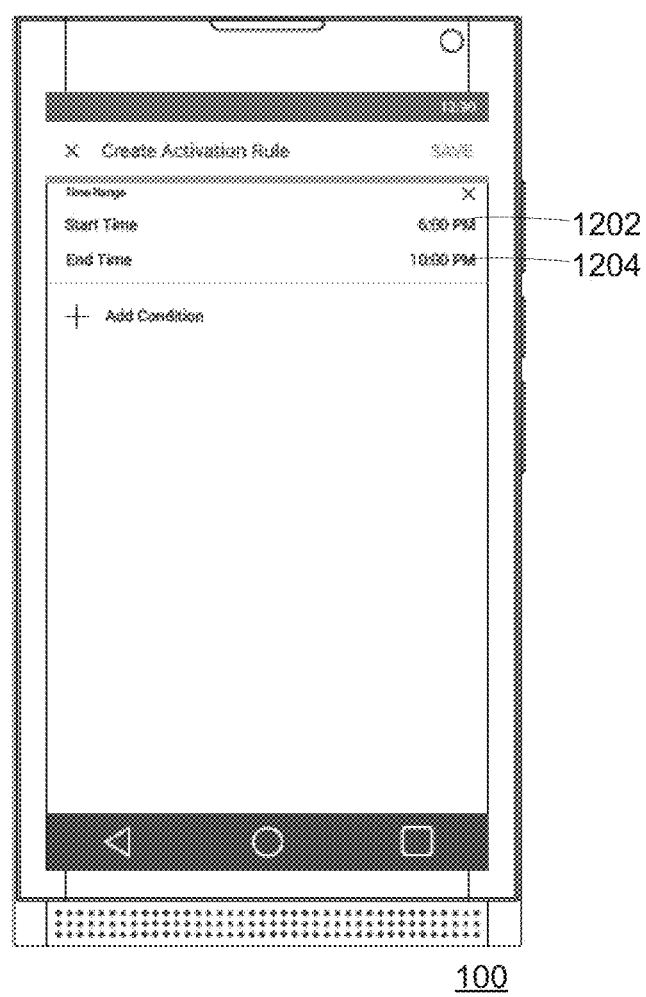

Examples of setting conditions are illustrated in FIG. 11 and FIG. 12. In the example illustrated in FIG. 11, the Battery Level option 1006 is selected and a slider bar 1102 is utilized to select the threshold battery charge. The threshold may be adjusted by a gesture to slide the slider to the left to lower the threshold, or to the right to increase the threshold. The condition that is set may be met, for example, when the battery charge does not meet the threshold set utilizing the slider bar 1102. In the example illustrated in FIG. 12, the Time option 1004 is selected and a Start Time 1202 and an End Time 1204 are selectable to set a time range. The condition that is set may be met, for example, when the current time is within the set time range.

Advantageously, a condition or set of conditions may be utilized to automatically enter a reduced battery use state in response to detecting that the portable electronic device is coupled to a charger. The condition or conditions may be factory set, preset in software, set by a user, or any combination thereof. Utilizing such conditions, the portable electronic device automatically enters the reduced battery use state without further user interaction when the portable electronic device is coupled to a charger. The reduced battery use state facilitates increased speed of charging such that a battery may reach a fully charged state earlier than when the portable electronic device 100 is not in the reduced battery use state or the battery may store more charge in a set period of time than the charge stored when the portable electronic device 100 is not in the reduced battery use state.

Utilizing conditions that are set by the user may increase the chance that the portable electronic device is maintained in the reduced battery use state during charging because the user may define conditions that suit that particular user.

The scope of the claims should not be limited by the preferred embodiments set forth in the examples, but should be given the broadest interpretation consistent with the description as a whole.

What is claimed is:

1. A method of controlling a portable electronic device having a battery, the method comprising:
   in response to detecting coupling of the portable electronic device to a charger for charging the battery of the portable electronic device:
      determining if a condition is met to enter a reduced battery use state, wherein the condition comprises one or more of a current time of day falling within a predetermined time period, a current date being a predetermined day of the week or date, a charge level of the battery falling to or below a threshold level, a location identified utilizing GPS functionality or network connection, a current WiFi connection being a predetermined WiFi connection, wireless connection or lack of a wireless connection to a second electronic device, connection or lack of connection to a cellular network, and use of low current charger comprising a USB port of a further electronic device;
      in response to determining that the condition to enter the reduced battery use state is met while the portable electronic device is coupled to the charger,
         identifying a configuration setting of the portable electronic device in the reduced battery use state; and
         entering the reduced battery use state by applying the configuration setting to adjust a configuration of the portable electronic device.

2. The method according to claim 1, comprising determining that the charger for charging the battery comprises a low current charger, and, in response to determining that the charger for charging the battery comprises a low current charger, providing an option to enter the reduced battery use state during charging of the battery.

3. The method according to claim 2, comprising, in response to receiving a selection of the option to enter the reduced battery use state, identifying the configuration setting of the portable electronic device in the reduced battery use state and applying the configuration setting to enter the reduced battery use state.

4. The method according to claim 1, comprising providing an option to exit the reduced battery use state after entry into the reduced battery use state and exiting the reduced battery use state in response to receipt of selection of the option to exit.

5. The method according to claim 1, comprising exiting the reduced battery use state in response to detecting uncoupling of the portable electronic device from the charger.

6. The method according to claim 5, wherein exiting the reduced battery use state comprises adjusting the configuration of the portable electronic device by returning to the configuration settings utilized immediately prior to detecting coupling of the portable electronic device to the charger.

7. The method according to claim 1, wherein, in response to determining that the condition to enter the reduced battery use state is met, a plurality of configuration settings are identified, including the configuration setting, and the plurality of configuration settings are applied to adjust the configuration of the portable electronic device.

8. The method according to claim 1, wherein the configuration setting comprises network connectivity including one or more of cellular network connectivity, Wi-Fi connectivity, and Bluetooth® connectivity and applying the configuration setting comprises turning off the network connectivity.

9. The method according to claim 1, wherein the configuration setting comprises a network connectivity mode of the portable electronic device and applying the configuration setting comprises turning on an airplane mode on the portable electronic device to disable network connectivity.

10. The method according to claim 1, wherein a plurality of conditions to enter the reduced battery use state are stored in memory at the portable electronic device, including the condition to enter the reduced battery use state.

11. A non-transitory computer-readable medium having computer-readable code stored thereon, the computer-readable code executable by at least one processor of the portable electronic device to perform the method according to claim 1.

12. A portable electronic device comprising:
a display for displaying information thereon;
an input device for receiving input;
a battery for providing power to the display and the input device;
a processor coupled to the battery, the display, and the input device, and configured to:
    in response to detecting coupling of the portable electronic device to a charger for charging the battery of the portable electronic device:
        determine if a condition is met to enter a reduced battery use state, wherein the condition comprises one or more of a current time of day falling within a predetermined time period, a current date being a predetermined day of the week or date, a charge level of the battery falling to or below a threshold level, a location identified utilizing GPS functionality or network connection, a current WiFi connection being a predetermined WiFi connection, wireless connection or lack of a wireless connection to a second electronic device, connection or lack of connection to a cellular network, and use of low current charger comprising a USB port of a further electronic device;
        in response to determining that the condition to enter the reduced battery use state is met while the portable electronic device is coupled to the charger,
            identify a configuration setting of the portable electronic device in the reduced battery use state; and
            enter the reduced battery use state by applying the configuration setting to adjust a configuration of the portable electronic device.

13. The portable electronic device according to claim 12, wherein the processor is operable to determine that the charger for charging the battery comprises a low current charger, and, in response to determining that the charger for charging the battery comprises a low current charger, provide, utilizing the display, an option to enter the reduced battery use state during charging of the battery.

14. The portable electronic device according to claim 12, wherein the processor is operable to, in response to receiving, at the input device, a selection of the option to enter the reduced battery use state, identifying the configuration setting of the portable electronic device in the reduced battery use state and applying the configuration setting to enter the reduced battery use state.

15. The portable electronic device according to claim 12, wherein the processor is operable to provide a selectable option to exit the reduced battery use state after entry into the reduced battery use state and to exit the reduced battery use state in response to receipt of selection of the option to exit.

16. The portable electronic device according to claim 12, wherein the processor is operable to exit the reduced battery use state in response to detecting uncoupling of the portable electronic device from the charger.

17. The portable electronic device according to claim 12, wherein the processor is operable to identify a plurality of configuration settings, including the configuration setting, and to apply the plurality of configuration settings to adjust the configuration of the portable electronic device.

18. The portable electronic device according to claim 12, wherein a plurality of conditions to enter the reduced battery use state are stored in memory at the portable electronic device, including the condition to enter the reduced battery use state.

* * * * *